Figure 1:
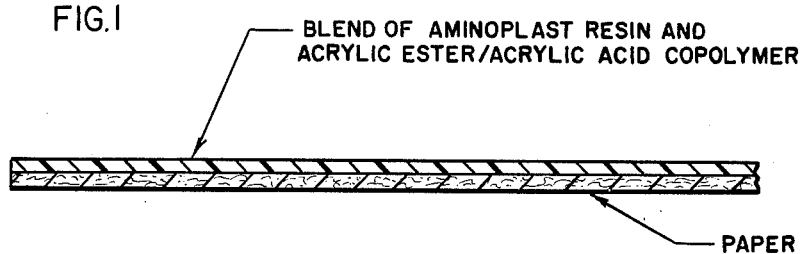

United States Patent Office 3,262,838
Patented July 26, 1966

3,262,838
REPULPABLE COATED PAPER
Richard D. Vieth, Kinnelon, and Joseph A. Dooley, Cedar Grove, N.J., assignors to Interchemical Corporation, New York, N.Y., a corporation of Ohio
Filed Apr. 4, 1963, Ser. No. 270,530
6 Claims. (Cl. 162—8)

The present invention relates to repulpable coated paper and more particularly to repulpable coated printed paper stock which has sufficient gloss and resistance to water or weathering to be used for magazine covers.

Coated paper used for magazine covers must have the following properties: (1) it must have high gloss (2) it must be resistant to water since it is generally exposed to weathering (3) it must cure rapidly since in conventional high speed coating operations for magazine covers, the curing time may be as low as a fraction of a second and (4) finally, and most important, the coated stock must be repulpable, that is the coating must be readily removable from the paper by the application of a dilute, about 2%, aqueous sodium hydroxide solution which is used in commercial deinking processes.

It is indeed rare to find a coated paper which is highly water resistant so that it may withstand the effects of weathering in exposed newsstands, thereby protecting printed matter, and yet may have its coating readily and completely removable by a dilute alkaline solution.

Among coated papers which have been previously tried for magazine covers, thermoset alkyd-amine coated papers have been found to be virtually unrepulpable because the coating can not be separated from the paper and the inks by a dilute alkaline solution. In addition alkyd-amine coatings do not dry at a sufficiently rapid rate to be utilizable in the high speed printing of magazine covers. On the other hand, oleoresinous coatings have been too slow in drying when applied in the film thicknesses required for high gloss in coatings for magazine stock. Furthermore, nitrocellulose lacquer coatings have less than desirable flammability properties and are too low in gloss for use as magazine coatings.

We have now found a novel coated paper which has all of the desirable required properties set forth above for magazine covers without any attendant detrimental properties.

The coated paper of this invention comprises a printed magazine stock substrate coated with a copolymer comprising from 15 to 30% of acrylic acid monomers and from 70 to 85% of acrylic monomers having the formula

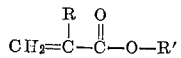

where R is a member selected from the group consisting of methyl and hydrogen R' is a lower alkyl radical and a thermosetting aminoplast resin.

It should be noted that in the present specification and claims, all proportions are by weight unless otherwise stated.

The acrylic copolymers may be made by conventional peroxide catalyzed addition polymerization of the monomeric constituents. The term acrylic acid is meant to include both acrylic acid and methacrylic acid. While the lower alkyl esters of acrylic acids such as methyl methacrylate, ethyl acrylate and butyl acrylate are preferred monomers, others such as ethyl hexyl acrylate and octyl acrylate may also be used.

The aminoplast resins preferably used in the blends of this invention are urea-formaldehyde and melamine-formaldehyde resins. However any available aminoplast resin made by the reaction of an aldehyde with a polyfunctional amide such as urea, biuret, dicyandiamide as well as triazine such as melamine substituted melamines and benzoguanamine will also be suitable.

Preferably from 3 to 10 parts of the acrylic copolymer are blended for each part of aminoplast resin.

The following examples will illustrate the practice of this invention.

The following ingredients are mixed:

Example 1

| | Parts by weight |
|---|---|
| A 54% solution in butanol of a copolymer of 75% ethyl acrylate monomers and 25% methacrylic acid monomers | 51.50 |
| Beckamine P-138 (60% solution of urea-formaldehyde resin in equal parts of xylene and butanol) | 8.75 |
| Methyl isobutyl ketone | 39.75 | and the resulting solution is coated by gravure coating onto printed magazine cover stock at 6 to 8 milligrams per square inch and cured for 0.5 second in a 700° F. high velocity air impingement oven. The coated stock displays good block resistance when subjected to 2 lbs./in.² pressure for 2 hours at 150° F. as well as excellent water resistance and high gloss.

In order to test for repulpability of the coated stock, about 100 square inches of the stock are shredded and placed in a conventional bath for repulping magazine stock comprising 250 ml. of a 2% aqueous sodium hydroxide solution, to which there has been added 1 g. of 325 mesh mica as a filtering aid and 3 g. of a wetting agent such as the commercial "Vel," sodium dodecylbenzene sulfonate, the bath having a temperature of 140° F. The mixture is stirred vigorously for 15 minutes. The slurry is poured onto a 40 mesh screen and washed with cold tap water. The mixture is reslurried, stirred for several minutes and again washed through a screen as described above. The slurry is then vacuum dried. Careful inspection of the remaining pulp reveals that the coating has completely disintegrated and been removed.

Figure 2:
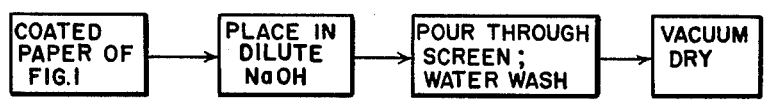

FIG. 1 is a diagram of the coated paper and FIG. 2 is a flow diagram of the process of this example.

Examples 2 and 3 are additional examples of the repulpable coated paper having about the same properties as the paper of Example 1.

Example 2

| | Parts by weight |
|---|---|
| A 48% solution in butanol of a copolymer of 40% ethyl acrylate monomers, 35% methyl methacrylate monomers and 25% methacrylic acid monomers | 49.2 |
| Resimene 879 (a 50% solution in butanol of butylated melamine-formaldehyde resin) | 10.0 |
| Hydrogenated sperm oil | 0.4 |
| Toluene | 40.4 |

The above solution is coated onto printed magazine cover stock in accordance with the procedure of Example 1.

Example 3

| | Parts by weight |
|---|---|
| A 50% solution in butanol of a copolymer of 50% ethyl acrylate, 25% methyl methacrylic and 25% methacrylic acid monomers | 52.0 |
| Beckamine P-138 | 8.5 |
| Methyl isobutyl ketone | 34.0 |
| Hydrogenated sperm oil | 0.5 |
| Hi-Flash Naphtha (a predominantly aromatic hydrocarbon solvent having a melting range of 312° to 361° F. and K.B. value of 90) | 5.0 |

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A repulpable coated paper comprising a printed paper surface coated with a blend of (1) a copolymer comprising from 15 to 30% by weight of acrylic acid monomers and from 70 to 85% by weight of acrylic ester material having the formula

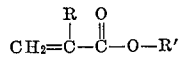

where R is a member selected from the group consisting of methyl and hydrogen and R' is a lower alkyl radical containing from 1 to 4 carbons, and (2) a thermosetting aminoplast resin selected from the group consisting of urea-formaldehyde and melamine-formaldehyde resin, the blend preferably comprising from 3 to 10 parts by weight of the acrylic copolymers for each part of aminoplast resin.

2. The repulpable coated paper of claim 1 wherein said copolymer comprises methacrylic acid and ethyl acrylate monomers.

3. The repulpable coated paper of claim 1 wherein said copolymer comprises methacrylic acid, ethyl acrylate and methyl methacrylate monomers.

4. A process for repulping coated printed paper which comprises applying a dilute aqueous solution of sodium hydroxide to a paper comprising a printed substrate coated with a blend of (1) a copolymer comprising from 15 to 30% of acrylic acid monomers and from 70 to 85% of acrylic ester material having the formula

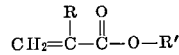

where R is a member selected from the group consisting of methyl and hydrogen and R' is a lower alkyl radical containing from 1 to 4 carbons, and (2) a thermosetting aminoplast resin selected from the group consisting of urea-formaldehyde and melamine-formaldehyde resins.

5. The process of claim 4 wherein said copolymer comprises methacrylic acid and ethyl acrylate monomers.

6. The process of claim 4 wherein said copolymer comprises methacrylic acid, ethyl acrylate and methyl methacrylate monomers.

References Cited by the Examiner

UNITED STATES PATENTS 2,098,751 4/1936 Murray.
2,931,742 4/1960 Hicks.
3,152,940 10/1964 Abel et al.

MURRAY KATZ, *Primary Examiner.*

WILLIAM D. MARTIN, *Examiner.*